US011484987B2

(12) United States Patent
Gadgil et al.

(10) Patent No.: US 11,484,987 B2
(45) Date of Patent: Nov. 1, 2022

(54) MAINTENANCE METHODS FOR POLISHING SYSTEMS AND ARTICLES RELATED THERETO

(71) Applicant: Applied Materials, Inc., Santa Clara, CA (US)

(72) Inventors: Shantanu Rajiv Gadgil, Santa Clara, CA (US); Sumit Subhash Patankar, Fremont, CA (US); Nathan Arron Davis, Gilbert, AZ (US); Michael J. Coughlin, Livermore, CA (US); Allen L. D'Ambra, Burlingame, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 192 days.

(21) Appl. No.: 16/813,275

(22) Filed: Mar. 9, 2020

(65) Prior Publication Data

US 2021/0276144 A1    Sep. 9, 2021

(51) Int. Cl.
| | |
|---|---|
| *B24B 53/017* | (2012.01) |
| *B24B 37/34* | (2012.01) |
| *C09D 5/00* | (2006.01) |
| *B65D 81/32* | (2006.01) |
| *B65D 47/42* | (2006.01) |
| *B05C 17/00* | (2006.01) |

(Continued)

(52) U.S. Cl.
CPC ............ *B24B 53/017* (2013.01); *B05C 17/00* (2013.01); *B24B 37/34* (2013.01); *B65D 81/3266* (2013.01); *C09D 5/00* (2013.01); *B05D 1/28* (2013.01); *B05D 5/08* (2013.01); *B65D 47/42* (2013.01)

(58) Field of Classification Search
CPC ..... B24B 53/017; B24B 37/34; B24B 53/053; B24B 53/062; C09D 5/00; C09D 5/20; B65D 81/3266; B65D 81/3261; B65D 81/3288; B65D 47/42; B05C 17/00; B05C 17/00583; B05D 1/28; B05D 5/08; B05D 5/00

USPC .............................. 401/132–136; 15/104.93
See application file for complete search history.

(56) References Cited

U.S. PATENT DOCUMENTS

| | | |
|---|---|---|
| 5,990,012 A | 11/1999 | Robinson et al. |
| 6,156,389 A | 12/2000 | Brown et al. |

(Continued)

FOREIGN PATENT DOCUMENTS

| | | |
|---|---|---|
| CN | 102015290 A | 4/2011 |
| CN | 103862364 A | 6/2014 |

(Continued)

OTHER PUBLICATIONS

ACULON® NanoProof™ 5.0 Hydrophobic/Oleophobic coating, revised Jul. 18, 2016, 2 pages.

(Continued)

*Primary Examiner* — David J Walczak
(74) *Attorney, Agent, or Firm* — Patterson + Sheridan, LLP

(57) ABSTRACT

Chemically impregnated applicators used to provide hydrophobic surfaces on chemical mechanical polishing system components and related application methods. A method of forming a hydrophobic coating on a surface of a polishing system component includes cleaning the surface of the polishing system component to remove a polishing fluid residue therefrom and applying a hydrophobicity causing chemical solution to the surface of the polishing system component.

9 Claims, 4 Drawing Sheets

(51) Int. Cl.
  *B05D 1/28* (2006.01)
  *B05D 5/08* (2006.01)

(56) References Cited

U.S. PATENT DOCUMENTS

| | | | |
|---|---|---|---|
| 6,540,595 | B1 | 4/2003 | Birang |
| 7,614,939 | B2 | 11/2009 | Tolles et al. |
| 8,104,986 | B2 * | 1/2012 | Nash .................. B65D 81/3294 401/125 |
| 10,434,627 | B2 | 10/2019 | Attur |
| 2003/0211743 | A1 | 11/2003 | Chang et al. |
| 2003/0236056 | A1 | 12/2003 | Boo et al. |
| 2004/0258457 | A1 * | 12/2004 | Legendre ............... A45D 34/04 401/133 |
| 2005/0064709 | A1 | 3/2005 | Shimomura et al. |
| 2006/0040595 | A1 | 2/2006 | Svirchevski et al. |
| 2008/0113513 | A1 | 5/2008 | Baum |
| 2008/0178917 | A1 | 7/2008 | Miyagi et al. |
| 2012/0017614 | A1 | 1/2012 | Clancy |
| 2012/0264229 | A1 | 10/2012 | Wan |
| 2012/0264299 | A1 | 10/2012 | Liao et al. |
| 2012/0324661 | A1 * | 12/2012 | DeDominicis .......... A47L 13/17 15/104.93 |
| 2014/0213158 | A1 | 7/2014 | Umemoto et al. |
| 2014/0235144 | A1 | 8/2014 | Kim et al. |
| 2016/0151250 | A1 * | 6/2016 | Houser, Jr. ......... B65D 75/5838 15/104.93 |
| 2016/0176016 | A1 | 6/2016 | Attur |

FOREIGN PATENT DOCUMENTS

| | | |
|---|---|---|
| EP | 1848028 A1 | 10/2007 |
| JP | 2000-349054 A | 12/2000 |
| JP | 2003133270 A | 5/2003 |
| JP | 2003-179021 A | 6/2003 |
| JP | 2003179021 A | 6/2003 |
| JP | 2005082719 A | 3/2005 |
| JP | 2006-120912 A | 5/2006 |
| JP | 2006185901 A | 7/2006 |
| JP | 2006223936 A | 8/2006 |
| JP | 2008183532 A | 8/2008 |
| JP | 4177214 B2 | 11/2008 |
| JP | 2009539626 A | 11/2009 |
| JP | 4892912 B2 | 3/2012 |
| JP | 2012051037 A | 3/2012 |
| JP | 2013206984 A | 10/2013 |
| KR | 20070026020 A | 3/2007 |
| KR | 100785604 B1 | 12/2007 |
| KR | 20130038764 A | 4/2013 |
| WO | 2007143566 A2 | 12/2007 |

OTHER PUBLICATIONS

ACULON® NanoProof™ 5.1 Hydrophobic/Oleophobic coating, revised Jul. 18, 2016, 2 pages.
Arkles, Barry, "Hydrophobicity, Hydrophilicity and Silanes", Reprinted with permission from the Oct. 2006 issue of Paint & Coatings Industry magazine (10 pgs.)
Babcock, Dale, "Materials for Oleophobic and Hydrophobic Coatings" Satomer-Booth 748, Boston, MA (2012), 34 pgs.
Boinovich, L B, et al. "Hydrophobic Materials and Coatings: Principles of Design, Properties and Applications", Russian Chemical Reviews 77, vol. 7, pp. 583-600 (2008).
King, Mark, et al., Cleaning CMP Residues with Pre-wetted Wipers, ITW Texwipe, Aug. 10, 2007, 4 pages.
New Objective: Innovation in High-Performance LC-MS, "What is Electrospray?", http://www.newobjective.com/electrospray/whatisESI.shtml, Mar. 9, 2020, 2 pages.
SONO-TEK—Ultrasonic Coating, How UltraSonic Nozzles Work, "Innovation by Design: What Makes Ultrasonic Nozzles Unique?," https://www.sono-tek.com/ultrasonic-coating/how-ultrasonic-nozzles-work/, Mar. 9, 2020, 4 pages.
International Search Report dated May 28, 2021 for application No. PCT/US2021/017354.

* cited by examiner

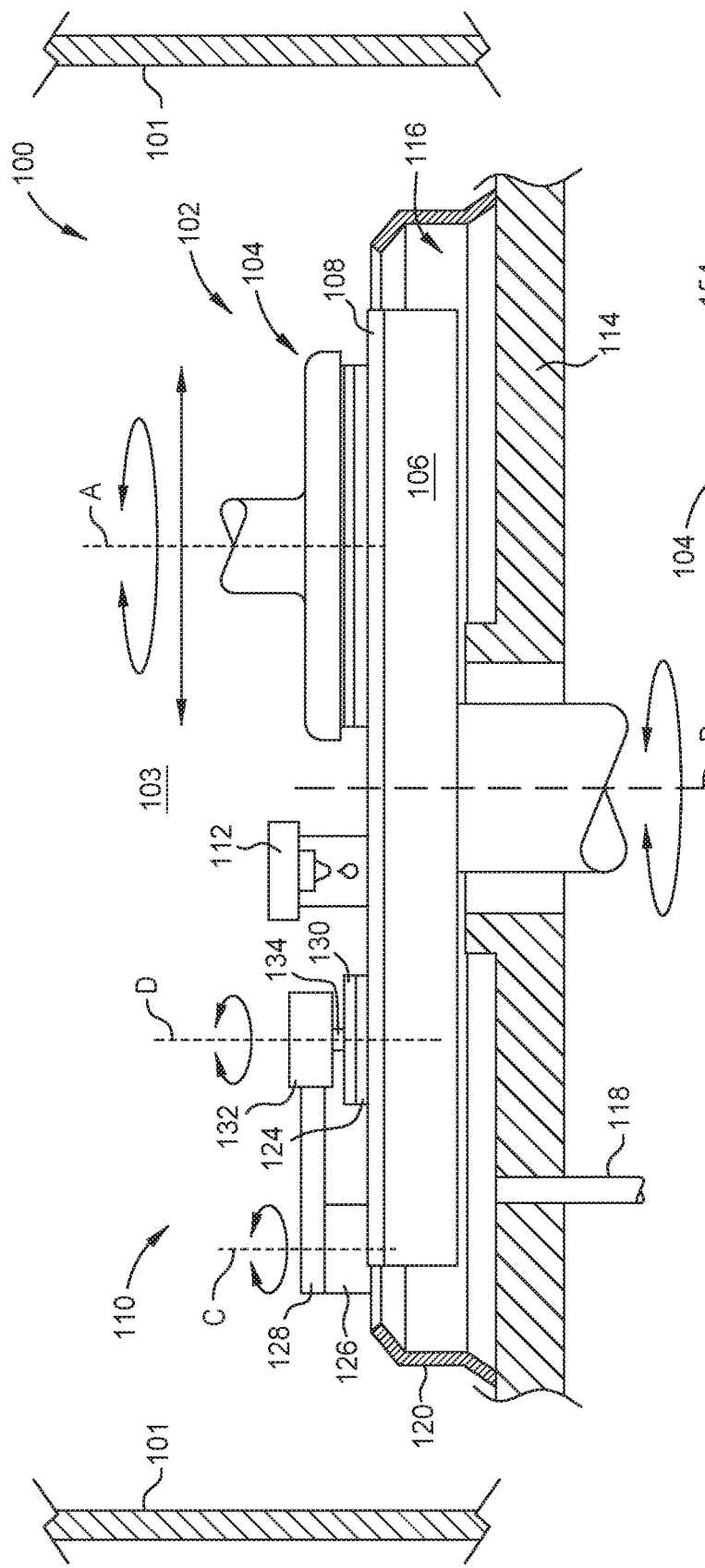
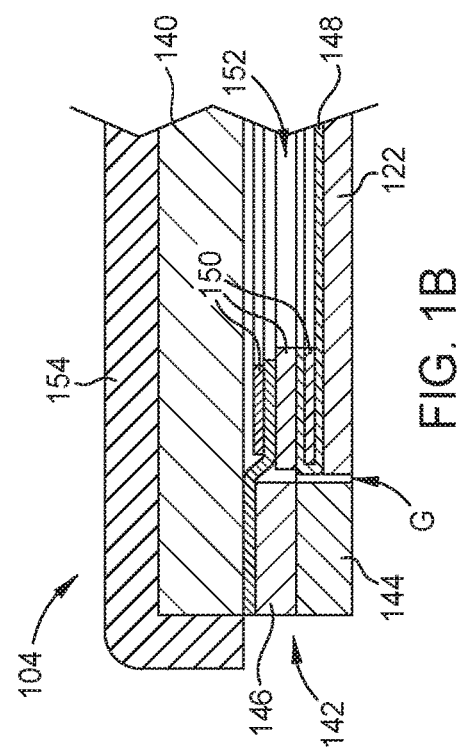
FIG. 1A
FIG. 1B

US 11,484,987 B2

MAINTENANCE METHODS FOR POLISHING SYSTEMS AND ARTICLES RELATED THERETO

BACKGROUND

Embodiments of the present disclosure generally relate to chemical mechanical polishing (CMP) systems used in the manufacturing of semiconductor devices. In particular, embodiments herein relate to methods of maintaining hydrophobic component surfaces in a CMP system and hydrophobicity applicator articles related thereto.

DESCRIPTION OF THE RELATED ART

Chemical mechanical polishing (CMP) is commonly used in the manufacturing of semiconductor devices to planarize or polish a layer of material deposited on a substrate surface. In a typical CMP process, a substrate is retained in a substrate carrier which presses the backside of the substrate towards a rotating polishing pad in the presence of a polishing fluid. Generally, the polishing fluid comprises an aqueous solution of one or more chemical constituents and nanoscale abrasive particles suspended in the aqueous solution. Material is removed across the material layer surface of the substrate in contact with the polishing pad through a combination of chemical and mechanical activity which is provided by the polishing fluid and the relative motion of the substrate and the polishing pad.

CMP is generally considered a wet process, and the accumulation of undesired byproducts of polishing fluids which have dried on surfaces within the wet environment of a CMP system is largely unavoidable. Typically, this accumulation comprises agglomerated abrasive particles which are left behind once polishing fluid overspray from the CMP process has been allowed to dry on system surfaces. Unlike the individual nanoscale abrasive particles held in suspension in a carefully formulated polishing fluid, dried agglomerations of abrasive particles can cause serious damage to the surface of a substrate should they come into contact therewith during a CMP process. This damage often manifests as scratches, e.g., micro-scratches, on the substrate surface which may detrimentally affect the performance of a device formed thereon or in some circumstances, may render the device inoperable.

Accordingly, there is a need in the art for articles and related methods that solve the problem described above.

SUMMARY

The present disclosure generally relates to chemically impregnated applicators which may be used to provide hydrophobic surfaces on CMP system components and related application methods.

In one embodiment, a method of forming a hydrophobic coating on a surface of a polishing system component is provided. The method includes cleaning the surface of the polishing system component to remove a polishing fluid residue therefrom and applying a hydrophobicity causing chemical solution to the surface of the polishing system component.

In another embodiment, a method of forming a hydrophobic coating on a surface of a polishing system component is provided. The polishing system component is disposed within a substrate processing environment of a polishing system. The method includes cleaning the surface of the polishing system component to remove a polishing fluid residue therefrom and applying a hydrophobicity causing chemical solution to the surface of the polishing system component. In some embodiments, the hydrophobicity causing solution is applied to the surface of the polishing system component without removing the polishing system component from the substrate processing environment.

In another embodiment, a hydrophobicity applicator is provided. Generally, the hydrophobicity applicator includes an applicator article formed of an open-celled foam material which has a porosity of about 60% or more and a hydrophobicity causing chemical solution. In some embodiments, the applicator and the hydrophobicity causing chemical solution are packaged together in a sealed container.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1A is a schematic side view of an exemplary polishing system that may be used with the methods provided herein, according to one embodiment.

FIG. 1B is a schematic sectional view of a portion of the substrate carrier used with the polishing system of FIG. 1A, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2:
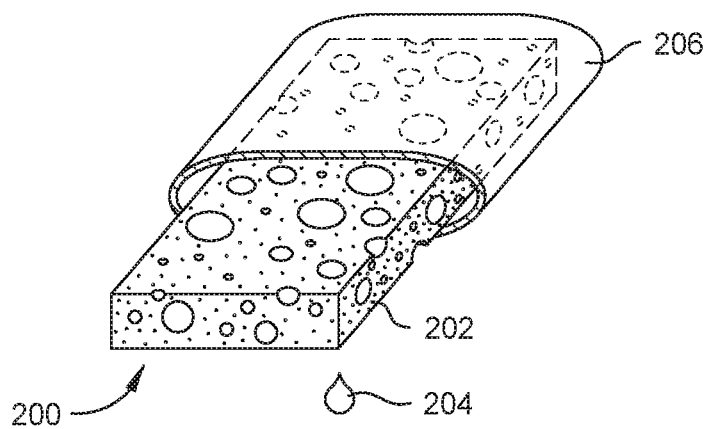
FIG. 2 is a schematic isometric view of a hydrophobicity applicator, according to one embodiment, which may be used to perform the methods set forth herein.

Embodiments of the present disclosure generally relate to articles for use in maintaining a chemical mechanical polishing (CMP) system. In particular, embodiments herein relate to hydrophobicity applicators which may be used to provide hydrophobic surfaces on CMP system components and methods related thereto.

A typical polishing fluid used in a CMP process may comprise an aqueous solution of one or more chemical constituents along with nanoscale abrasive particles suspended in the aqueous solution. Commonly, dried residues of the polishing fluid, such as agglomerations of abrasive particles, accumulate on component surfaces that are disposed above or otherwise proximate to the polishing pad during the polishing process. For example, dried residues of the polishing fluid often accumulate on surfaces of CMP system components that are disposed over a polishing pad as a polishing fluid is dispensed thereon, such as substrate carriers, pad conditioner assemblies, and/or fluid delivery arms. If the accumulated residue is not removed, agglomerations of abrasive particles may flake from the component surfaces onto the polishing pad and cause undesirable damage, e.g., scratches, to the material surface of a substrate subsequently polished thereon. Removing the accumulated residue is generally laborious and time-consuming as the agglomerated abrasive particles often form cement-like layers on component surfaces, thus resulting in undesirable extended and frequent polishing system downtime for consumable change-out and/or preventive maintenance (PM) procedures.

Generally, surfaces of the polishing components that are exposed to polishing fluid overspray are formed of materials having a chemical and/or corrosion resistance to the polishing fluid. In some embodiments, the surfaces may be formed of a hydrophobic material and/or have a hydrophobic coating so that droplets of polishing fluid are more likely to run off of the component surface before drying and forming undesirable polishing fluid residues thereon. Unfortunately, the delicate liquid-surface interfaces that provide the hydrophobicity for such materials and/or coatings have limited durability. Thus, in a typical CMP processing environment the hydrophobicity of the surface of a CMP component may be significantly degraded long before the end of the useful lifetime of the component. For example, regular maintenance procedures to clean polishing fluid residue from CMP components, and the materials used therewith, such as abrasive cleaning clothes, corrosive chemistries, as well as the particles in the accumulated polishing fluid residue, often abrade the component surface, thus reducing the hydrophobicity thereof. Once the surface of a component has been abraded, the rate of polishing fluid residue accumulation thereon increases due to reduced ability of the surface to repel droplets of polishing fluid therefrom. Thus, embodiments herein beneficially provide for methods of periodically restoring the hydrophobicity of CMP component surfaces as well as hydrophobicity applicators which may be used to implement the methods. Herein, the hydrophobicity applicators are packaged to include both an applicator article and a hydrophobicity causing solution in a single-use package container so as to avoid common restrictions on storage and transport of containers of liquid within the substrate processing portions of a semiconductor device manufacturing facility.

In some embodiments, the methods include treating the component surfaces during a CMP consumable change-out procedure. CMP consumables generally include articles used in a CMP process which have a limited useful lifetime due to substrate processing related wear and thus require periodic replacement depending on the number of substrates processed, or the accumulated substrate processing time, thereon or therewith. Examples of CMP consumables include polishing pads, pad conditioning disks, and some components of substrate carriers. The methods generally include cleaning any accumulated polishing fluid residue from CMP component surfaces and then treating the component surface to refresh the hydrophobicity thereof. The newly refreshed hydrophobic surface beneficially reduces the amount of polishing fluid residue that may accumulate on the component surfaces between consumable change outs or other maintenance procedures, which in turn beneficially reduces the cleaning time and labor associated therewith. An exemplary polishing system that may benefit from the embodiments set forth herein is shown in FIG. 1A.

FIG. 1A is a schematic side view of an exemplary polishing system 100 which may benefit from the applicators and related methods provided herein, according to one embodiment. FIG. 1B is a schematic sectional view of a portion of the substrate carrier assembly 104 used with the polishing system 100 in FIG. 1A, according to one embodiment.

Typically, the polishing system 100 features a frame (not shown) and a plurality of panels 101 which define a substrate processing environment 103. The polishing system 100 includes a plurality of polishing stations 102 (one shown) and a plurality of substrate carrier assemblies 104 (one shown) which are disposed within the substrate processing environment 103.

As shown in FIG. 1A, a polishing station 102 includes a platen 106, a polishing pad 108 mounted on the platen 106 and secured thereto, a pad conditioner assembly 110 for cleaning and/or rejuvenating the polishing pad, and a fluid delivery arm 112 for dispensing polishing fluid onto the polishing pad 108. Here, the platen 106 is disposed above a base plate 114 and is circumscribed by a platen shield 120 (both shown in cross section) which collectively define a drainage basin 116. The drainage basin 116 is used to collect fluids spun radially outward from the platen 106 and to drain the fluids through a drain 118 in fluid communication therewith.

The pad conditioner assembly 110 is used to clean and/or rejuvenate the polishing pad 108 by sweeping polishing byproducts therefrom, such as with a brush (not shown), and/or by abrading the polishing pad 108 by urging an abrasive pad conditioning disk 124 (e.g., a diamond impregnated disk) there against. Pad conditioning operations may be done between polishing substrates, i.e., ex-situ conditioning, concurrently with polishing a substrate, i.e., in-situ conditioning, or both.

Here, the pad conditioner assembly 110 includes a first actuator 126 disposed on the base plate 114, a conditioner arm 128 coupled to the first actuator 126, and a conditioner mounting plate 130 having the conditioner disk 124 fixedly coupled thereto. A first end of the conditioner arm 128 is coupled to the first actuator 126, and the mounting plate 130 is coupled to a second end of the conditioner arm 128 that is distal from the first end. The first actuator 126 is used to sweep the conditioner arm 128, and thus the conditioner disk 124, about an axis C so that the conditioner disk 124 oscillates between an inner radius of the polishing pad 108 and an outer radius of the polishing pad 108 while the polishing pad 108 rotates there beneath. In some embodiments, the pad conditioner assembly 110 further includes a second actuator 132 disposed at, and coupled to, the second end of the conditioner arm 128, the second actuator 132 is used to rotate the conditioner disk 124 about an axis D. Typically, the mounting plate 130 is coupled to the second actuator 132 using a shaft 134 disposed there between.

Generally, the rotating substrate carrier assembly 104 is swept back and forth from an inner radius to an outer radius of the platen 106 while the platen 106, and thus the polishing pad 108, rotate about a platen axis B there beneath. The polishing fluid is delivered to the polishing pad 108 using the fluid delivery arm 112 positioned there over and is further delivered to a polishing interface between polishing pad 108 and the substrate 122 by the rotation of the polishing pad 108 about the platen axis B. Often, the fluid delivery arm 112 further includes a plurality of nozzles (not shown) which may be used to deliver relatively high pressure streams of a cleaning or fluid, e.g., deionized water, to the polishing pad 108.

As shown in FIG. 1B, the substrate carrier assembly 104 features a carrier head 140, a carrier ring assembly 142 coupled to the carrier head 140, and a flexible membrane 148 disposed radially inward of the carrier ring assembly 142 to provide a mounting surface for the substrate 122. The carrier ring assembly 142 includes a lower annular portion and an upper annular portion, here the substrate retaining ring 144 and the backing ring 146 respectively. The substrate retaining ring 144 is typically formed of a polymer which is bonded to the backing ring 146 using a bonding layer (not shown) disposed therein. The backing ring 146 is formed of a rigid material, such as a metal or ceramic, and is secured to the carrier head 140 using a plurality of fasteners (not shown). Examples of suitable materials used to form the substrate retaining ring 144 and the backing ring 146 respectively include any one or combination of the polishing fluid chemical resistant polymers, metals, and/or ceramics described herein. The flexible membrane 148 is typically coupled the carrier head 140 using one or more annular membrane clamps 150 to collectively define a volume 152 therewith.

During substrate processing, the substrate retaining ring 144 surrounds the substrate 122 to prevent the substrate 122 from slipping from the substrate carrier assembly 104. Typically, the volume 152 is pressurized during polishing to cause the flexible membrane 148 to exert a downward force on the substrate 122 while the substrate carriers 104 rotates about the carrier axis A, thus urging the substrate 122 against the polishing pad 108. Before and after polishing, a vacuum is applied to the volume 152 so that the flexible membrane 148 is deflected upwards to create a low pressure pocket between the flexible membrane 148 and the substrate 122, thus vacuum-chucking the substrate 122 to the substrate carrier assembly 104.

Generally, the inner diameter of the substrate retaining ring 144 is greater the diameter of the substrate 122 to allow for some clearance there between during the polishing process and substrate loading and unloading operations, such as greater than about 2 mm or more, or greater than about 3 mm or more. Similarly, the outer diameter of the substrate mounting surface of the flexible membrane 148 is less than the inner diameter of the substrate retaining ring 144 to allow the flexible membrane 148 to move relative thereto. The clearance between the substrate 122 and the substrate retaining ring 144 and between the flexible membrane 148 and the substrate retaining ring 144 creates a gap G. Often, polishing fluid will enter the gap G and polishing fluid residues may form on one or more surfaces therein, such as the radially inward facing surfaces of one or both of the substrate retaining ring 144 and the backing ring 146 and the radially outward facing surfaces of one or more of the annular membrane clamps 150. In some embodiments, the substrate carrier assembly 104 further includes a head cover 154 disposed on the carrier head 140.

Herein, one or more surfaces of the polishing system 100, and/or components thereof, e.g., the surfaces of the pad conditioner assembly 110, the platen shield 120, and the substrate carrier assembly 104 are treated using the hydrophobicity applicator and/or spray methods set forth herein to prevent and/or substantially reduce polishing fluid residues from accumulating thereon.

FIG. 2 is a schematic isometric view of a hydrophobicity applicator 200, according to one embodiment, which may be used with the methods set forth herein. Here, the hydrophobicity applicator 200 includes an applicator article 202 which has been impregnated with a hydrophobicity causing chemical solution 204. In this embodiment, the applicator article 202 is formed of a fiber-free foam material, e.g., a polyvinyl alcohol (PVA) or a polyurethane (PU) foam material, which is suitable for use in a clean room environment of a semiconductor device manufacturing facility. Generally, the foam material used to form the applicator article 202 has an open cell pore structure and a porosity of about 60% or more, such as about 65% or more, about 70% or more, about 75% or more, about 80% or more, or about 90% or more. In some embodiments, the foam material used to form the applicator article 202 has a density of about 50 kg/m$^3$ or more, such as about 60 kg/m$^3$ or more, about 70 kg/m$^3$ or more, for example about 80 kg/m$^3$ or more. In some embodiments, the applicator article 202 is soft and pliable at room temperature and thus typically has a glass transition temperature (Tg) of about 25° C. or less, such as about 20° C. or less, about 15° C. or less, or for example, about 10° C. or less. One or both of the pore size and density vary throughout the applicator article 202 (as shown) or one or both of the pore size and density may be uniformly distributed thereacross. In other embodiments, the applicator article 202 may be formed of a suitable fiber-based synthetic material, e.g., a polyester cloth.

Here, the hydrophobicity causing chemical solution 204 includes one of a solution, mixture, and/or emulsion, which features a solvent and a hydrophobicity causing agent. In some embodiments, the hydrophobicity causing chemical solution 204 further includes a surfactant, such as a carboxylic acid based constituent. Examples of suitable solvents include hydrocarbon solvents, fluorosolvents, or combinations thereof. In some embodiments, the fluorosolvent is a hydrofluoroether (HFE) based solvent, such as 2-trifluoromethyl-3-ethoxydodecafluorohexane. Examples of suitable hydrophobicity causing agents include monomers, oligomers, and/or other functional groups of siloxanes, fluoroacrylates, or combinations thereof. Examples of suitable fluorinated acrylic monomers include: pentafluorophenyl acrylate, hexafluoroisopropyl methacrylate; 1H,1H,3H-Hexafluorobutyl methacrylate; 2,2,2-trifluoroethyl acrylate; 2,2,2-trifluoroethyl methacrylate; 1H,1H,2H,2H-heptadecafluorodecyl methacrylate (HDFDMA); 1H, 1H,5H-octafluoropentyl methacrylate; and combinations thereof. The carboxylic acid based constituent may be a carboxylic acid, carboxylic acid salt, a carboxylic acid derivative, or a combination thereof.

Here, the applicator article 202 is impregnated with the hydrophobicity causing chemical solution 204 before, or concurrently with, being packaged in a container 206 (shown in partial cross-section) which is sealed to prevent exposure of the hydrophobicity applicator 200 to atmosphere. The container 206 may be formed of any suitable material generally accepted for use in a clean room environment, such as an antistatic polyethylene material. Generally, the packaged applicator article 202 is less than fully saturated with the hydrophobicity causing chemical solution 204 in order to provide improved control over the thickness of the hydrophobic coating formed during the application methods described herein. For example, if X represents the maximum amount by weight of the hydrophobicity causing chemical solution 204 that can be absorbed by the applicator article 202, the packaged applicator article 202 may have an actual saturation by weight of about 0.9× or less, such as about 0.8× or less, about 0.7× or less, about 0.6× or less, about 0.5× or less, or about 0.4× or less. In some embodiments, a packaged applicator article 202 has an actual saturation of the hydrophobicity causing chemical solution 204 by weight in a range from about 0.1× to about 0.5×, such as about 0.2× to about 0.5×, or about 0.3× to about 0.5×. In some embodiments, a packaged applicator article 202 has an actual saturation of the hydrophobicity causing chemical solution 204 by weight in a range from about 0.5× to about 0.9×, such as about 0.6× to about 0.9×, or about 0.7× to about 0.9×. In some embodiments, a packaged applicator article 202 has an actual saturation of the hydrophobicity causing chemical solution 204 by weight in a range from about 0.2× to about 0.8×, such as about 0.3× to about 0.7×, or about 0.4× to about 0.5×.

Figure 3:
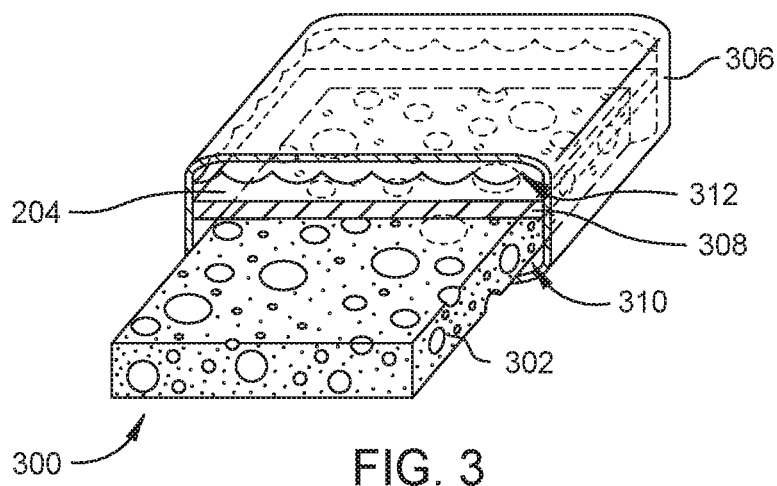
FIG. 3 is a schematic isometric view of a hydrophobicity applicator, according to another embodiment, which may be used to perform the methods set forth herein.

FIG. 3 is a schematic isometric view of a hydrophobicity applicator 300, according to another embodiment, that may be used with the methods set forth herein. Here, a container 306 (shown in partial cross-section) is substantially similar to the container 206 described in FIG. 2 and further includes an impermeable membrane 308 which divides the container 306 into a first volume 310 and a second volume 312. An applicator article 302 and the hydrophobicity causing chemical solution 204 are respectively disposed in the first volume 310 and the second volume 312 and are thus separated by the membrane 308. Prior to the methods set forth herein, a user manipulates the container 306 to break the membrane 308 thus allowing the hydrophobicity causing chemical solution 204 to be absorbed by, and/or coat the surface of, the applicator article 302 to form the hydrophobicity applicator 300. Here, the applicator article 302 is substantially similar or the same as the applicator article 202 described in FIG. 2. Typically, an amount of hydrophobicity causing chemical solution 204 disposed in the second volume 312 is selected to provide a desired actual saturation of the applicator article 302 with the hydrophobicity causing chemical solution 204 once the membrane 308 is broken. In some embodiments, the desired actual saturation of the applicator article 302 is within the same ranges as set forth for the actual saturation of the applicator article 202 described in FIG. 2.

Figure 4A:
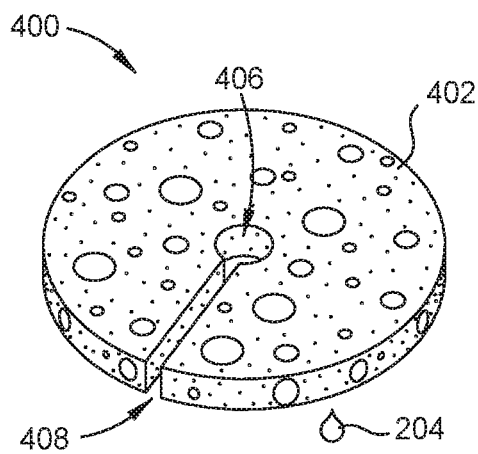
FIG. 4A is a schematic isometric view of a hydrophobicity applicator, according to another embodiment, which may be used to perform the methods set forth herein.

FIG. 4A is a schematic isometric view of a hydrophobicity applicator 400, according to another embodiment, that may be used with the methods set forth herein. The hydrophobicity applicator 400 comprises an applicator article 402 impregnated with the hydrophobicity causing chemical solution 204. Here, the applicator article 402 is sized and shaped to apply the hydrophobicity causing chemical solution 204 to surfaces of the pad conditioner assembly 110, such as the surfaces of, and disposed between, the conditioner mounting plate 130 and the second actuator 132 of FIG. 1A.

The applicator article 402 comprises a cylindrical disk having a diameter which is about the same or greater than a diameter of the conditioner mounting plate 130, a thickness which is about the same or less than a distance between the mounting plate 130 and the second actuator 132, and an opening 406 sized to fit about the shaft 134. For example, in some embodiments the applicator article 402 has a diameter of about 100 mm or more, such as about 150 mm or more, or about 200 mm or more, between about 100 mm and about 300 mm, and a thickness of about 50 mm or less, such as about 40 mm or less, or about 30 mm or less, or between about 10 mm and about 50 mm. The generally circular shaped opening 406 is disposed through the center of the cylindrical disk (or proximate thereto) and has a diameter that is about the same or slightly less than a diameter of the shaft 134. For example, in some embodiments, a diameter of the opening 406 is between about 10 mm and about 30 mm, such as between about 10 mm and about 20 mm. A slit 408 connects the opening 406 with the outer circumference of the applicator article 402 so that the applicator article 402 may be positioned about the shaft 134 without disassembling the mounting plate 130 from the pad conditioner assembly 110.

In some embodiments, the material used to form the applicator article 402 is substantially similar or the same as the material used form the applicator article 202 described in FIG. 2. The applicator article 402 and the hydrophobicity causing chemical solution 204 may be packaged using either one of the containers 206 and 306 described in FIGS. 2 and 3 respectively. In some embodiments, the actual or desired actual saturation of the applicator article 402 is within the same ranges as set forth for the actual saturation of the applicator article 202 described in FIG. 2.

Figure 4B:
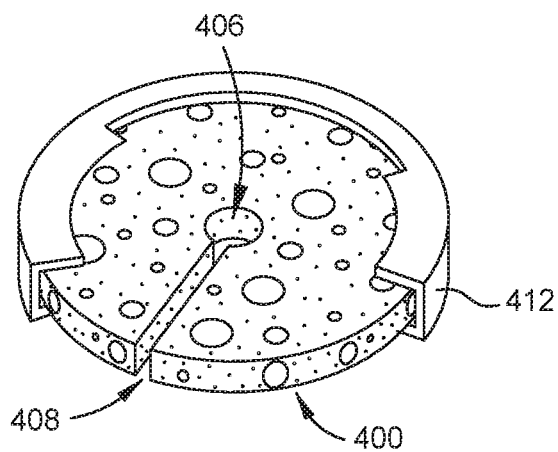
FIG. 4B is a schematic isometric view further illustrating a clamp which may be used with the hydrophobicity applicator described in FIG. 4A, according to one embodiment.

FIG. 4B is a schematic isometric view further illustrating a clamp 412 which may be used with the hydrophobicity applicator 400, according to some embodiments. As shown in FIG. 4B, the clamp 412 secures the edges of the hydrophobicity applicator 400 and provides an ergonomic hand hold for a user to facilitate the methods set forth herein. The clamp is typically formed of a non-rigid or semi-rigid material having a suitable chemical resistance to polishing fluids, such as a non-rigid or semi-rigid polymer, rubber, or synthetic rubber material which allows for hand-grip strength to hold the hydrophobicity applicator 400 in place during the methods set forth herein. In some embodiments, the mater used to form the clamp 412 has a shore A hardness in the range of about 60 to about 85.

Figure 5:
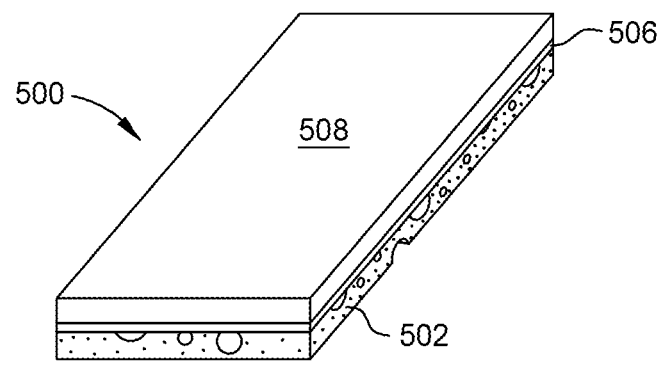
FIG. 5 is a schematic isometric view of a hydrophobicity applicator, according to another embodiment, which may be used to perform the methods set forth herein.

FIG. 5 is a schematic isometric view of a hydrophobicity applicator 500, according to another embodiment, which may be used with the methods set forth herein. The hydrophobicity applicator 500 comprises an applicator article 502 impregnated with the hydrophobicity causing chemical solution 204. In some embodiments, the material used to form the applicator article 502 is substantially similar or the same as the material used to form the applicator article 202 described in FIG. 2. In some embodiments, an actual or desired actual saturation of the applicator article 502 with the hydrophobicity causing chemical solution 204 is equal to or within the same ranges as set forth for the actual saturation of the applicator article 202 described in FIG. 2.

Here, the applicator article 502 is secured to a fastener layer, such as a first fastener layer 508, by use of an adhesive 506. In some embodiments, the first fastener layer 508 comprises one portion of a hook and loop fastener system which may be used to mount the hydrophobicity applicator 500 on an applicator apparatus 600 described in FIG. 6. The applicator article 502, having the first fastener layer 508 secured thereto, and the hydrophobicity causing chemical solution 204 may be packaged using either one of the containers 206 or 306 described in FIGS. 2 and 3 respectively.

Figure 6:
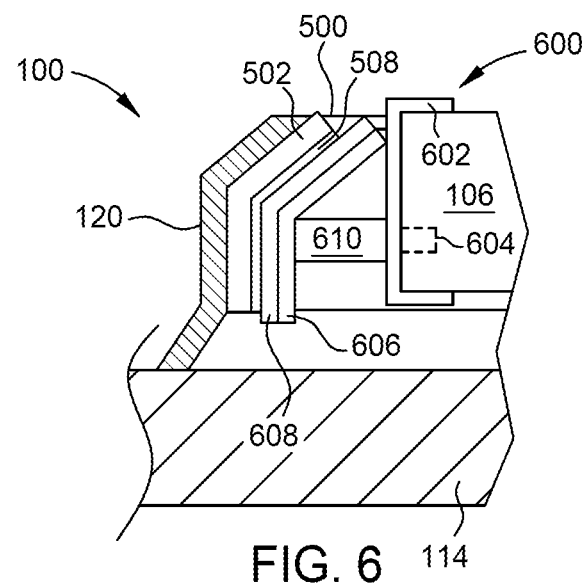
FIG. 6 is a schematic side view of a portion of the polishing system described in FIG. 1A and an applicator apparatus which may be used to perform aspects of the methods set forth herein, according to one embodiment.

FIG. 6 is a schematic side view of a portion of the polishing system 100 illustrating the applicator apparatus 600 which may be used with the methods set forth herein to apply the hydrophobicity causing chemical solution 204 to a portion of the platen shield 120, according to one embodiment. Typically, the applicator apparatus 600 is used between polishing pad change out procedures to urge the hydrophobicity applicator 500 against a radially inward facing surface of the platen shield 120 thus applying a layer of the hydrophobicity causing chemical solution 204 thereto. For example, in FIG. 6 the applicator apparatus 600 is temporarily coupled to a circumferential edge of the platen 106 using a clamp 602 disposed thereon and/or a fastener 604 (shown in phantom) disposed in a corresponding opening of the radially outward facing surface of the platen 106.

Here, the applicator apparatus 600 includes an applicator mounting portion 606 and a fastener layer, such as a second fastener layer 608, which comprises a second portion of a hook and loop fastener system. The second fastener layer 608 is secured to the surface of the applicator mounting portion 606 by use of an adhesive and the hydrophobicity applicator 500 is temporarily secured to the applicator mounting portion 606 by use of the hook and loop fastener system. Generally, the applicator apparatus 600 further includes a resilient member 610, such as a spring, which is used to urge the hydrophobicity applicator 500 against the radially inward facing surface of the platen shield 120 as the platen 106 is rotated about the platen axis B (shown in FIG. 1A). The applicator apparatus 600 beneficially enables the methods set forth herein without the need for the time consuming procedure of removing the platen shield 120 from the polishing system 100, thus resulting in desirably less system downtime for routine maintenance.

Figure 7:
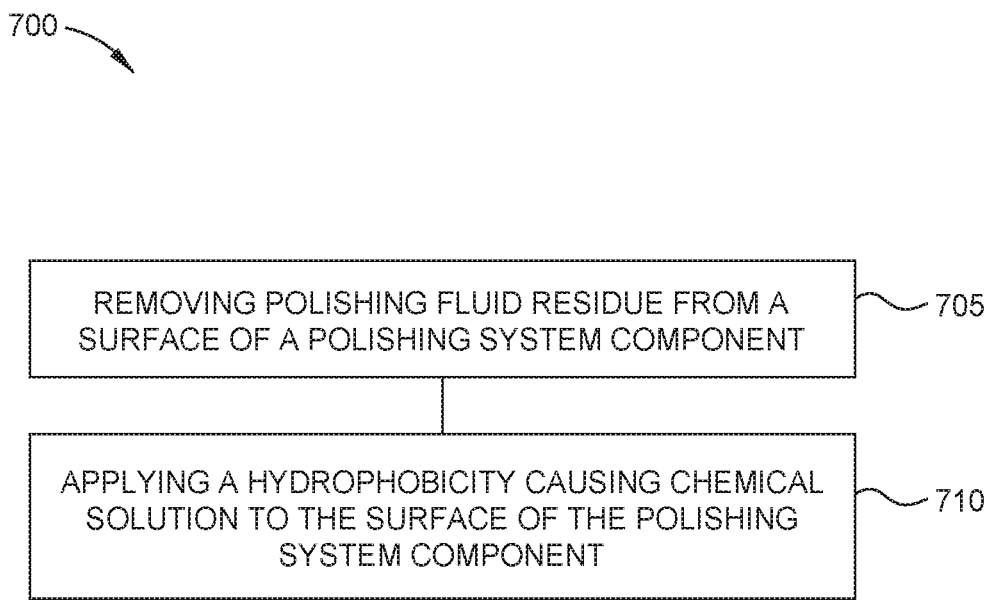
FIG. 7 is a diagram illustrating a method of applying a hydrophobic coating a surface of a polishing system component, according to one embodiment.

FIG. 7 is a diagram illustrating a method 700 of applying a hydrophobic coating on a surface of a polishing system component, such as a component of the polishing system 100 of FIG. 1A, according to one embodiment. Typically, the method 700 is performed during polishing system downtime in a regularly scheduled maintenance procedure, such as a consumable change-out procedure or a preventative maintenance (PM) procedure.

Figure 8:
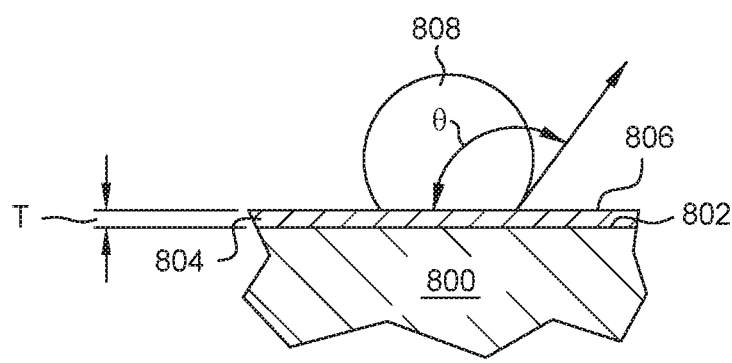
FIG. 8 is a schematic section view of a portion of a polishing system component surface formed according to the method set forth in FIG. 7 and further illustrating a contact angle of a water droplet disposed on the surface, according to one embodiment.

FIG. 8 is a schematic sectional view of a portion of a polishing system component 800 which is used to illustrate various aspects of the method 700. Here, the polishing system component 800 represents any component and/or other surface of the polishing system 100 which may be exposed to polishing fluid overspray during a substrate polishing process. For example, the polishing system component 800 may be any one of the panel 101, the substrate carrier assembly 104, a component of the pad conditioner assembly 110, the fluid delivery arm 112, the platen 106 and/or peripheral surface thereof, the platen shield 120, or any other surface or component used with and/or disposed within the substrate processing environment 103 of the polishing system 100. Generally, the system component 800 and/or a pre-application surface 802 thereof are formed of a polishing fluid chemistry resistant material. Examples of suitable materials include silica glass, quartz, ceramics, e.g., alumina, polishing fluid chemical resistant metals, and polishing fluid chemical resistant polymers. Examples of suitable metals include stainless steel alloys, nickel-chromium alloys, nickel-chromium-molybdenum alloys, nickel-iron-chromium-molybdenum alloys, cobalt-nickel-chromium-molybdenum alloys, and titanium allows. Examples of suitable polymers include polyphenylsulfide (PPS), polyethylene terephthalate (PET), polyetheretherketone (PEEK), polyimide (PI), and polybutylene terephthalate (PBT), acetal polyoxymethylene (POM), polyamideimide (PAI), polytetrafluoroethylene (PTFE), polybenzimidazole (PBI), polyether amine (PEI), and composites thereof.

At activity 705 the method 700 includes removing polishing fluid residue from a surface of a polishing system component, such as the pre-application surface 802. Typically, removing polishing fluid residue from the component includes urging a cleaning article, such as a sponge or cloth, against the pre-application surface 802 in the presence of a cleaning fluid. In some embodiments the cleaning article may have an abrasive surface. Generally, the cleaning fluid is selected based on the type of polishing fluid used with the exemplary polishing system 100 and the cleaning fluid's suitability for dissolving the residual deposits of that polishing fluid. Examples of suitable cleaning fluids include dilute solutions of hydrogen peroxide, ammonium hydroxide, and various acids, such as citric acid. In some embodiments the cleaning fluid may comprise a dilute aqueous solution having at least some of the same constituents as are used in the polishing fluid. For example, if the polishing fluid comprises potassium hydroxide, the cleaning fluid may comprise an aqueous solution of potassium hydroxide. In some embodiments, the cleaning fluid is deionized water. In some embodiments, the cleaning fluid comprises a surfactant. In some embodiments, removing the polishing fluid residue also removes a portion of a hydrophobic coating which was applied during a previous consumable change-out or preventative maintenance procedure. Generally, after removing the polishing fluid residue from the polishing system component 800 the pre-application surface 802 is rinsed using deionized water and dried, e.g., by blowing the surface with clean dry air (CDA).

At activity 710, the method 700 includes applying a hydrophobicity causing chemical solution, such as the hydrophobicity causing chemical solution 204 described herein, to the pre-application surface 802 of the polishing system component. Here, applying the hydrophobicity causing chemical solution 204 to the pre-application surface 802 forms a hydrophobic coating 804 having a post-application surface 806. Here, a water droplet 808 disposed on the system component forms a contact angle θ with the post-application surface 806 of about 60° or more, about 65° or more, about 70° or more, about 75° or more, about 80° or more, about 85° or more, about 90° or more, about 95° or more, about 100° or more, about 105° or more, or for example, about 110° or more. In some embodiments, the hydrophobic coating 804 has a thickness T of about 100 μm or less, such as about 85 μm or less, about 80 μm or less, about 75 μm or less, about 70 μm or less, about 65 μm or less, about 60 μm or less, about 55 μm or less, or about 50 μm or less.

As discussed herein, abrasion and corrosion of the pre-application surface 802 from repeated exposure of polishing fluid and cleaning of polishing fluid residues therefrom is likely to reduce the hydrophobicity of the pre-application surface 802 over the useful lifetime of the system component 800. Thus, in some embodiments, the pre-application surface 802 may have a water contact angle of about 100° or less, such as about 95° or less, about 90° or less, about 85° or less, about 80° or less, about 75° or less, about 70° or less, about 65° or less, about 60° or less, about 55° or less, or about 50° or less. In some embodiments, applying the hydrophobicity causing chemical solution 204 beneficially provides an increase in hydrophobicity of about 10% or more, such as about 15% or more, about 20% or more, about 25% or more, about 30% or more, about 35% or more, about 40% or more, about 45% or more, about 50% or more, about 65% or more, about 70% or more, for example about 75% or more. Here, the increase in hydrophobicity is determined using different in the water droplet contact angles θ of the pre-application surface 802 and the post-application surface 806.

In some embodiments, the hydrophobic coating 804 formed on the surface of the system component 800 exhibits oleophobic surface properties, e.g., having an increased resistance to non-aqueous contaminants such as dust, oils, and/or other particulates. Thus, in some embodiments, the hydrophobic coating 804 has an oil contact angle, here an n-hexadecane droplet contact angle, of about 50° or more, such as about 55° or more, about 60° or more, about 65° or more, for example about 70° or more. The n-hexadecane droplet contact angle is measured relative to the post-application surface 806, such as shown for water droplet contact angle θ in FIG. 8.

In some embodiments, applying the hydrophobicity causing chemical solution 204 to the system component 800 includes wiping or urging an applicator article impregnated with the hydrophobicity causing chemical solution 204 against the pre-application surface 802. For example, in some embodiments the method 700 may be performed using any one of the hydrophobicity applicators 200, 300, 400, and/or 500 described herein.

In some embodiments of the method 700, the hydrophobicity causing solution is applied to the surface of the polishing system component without removing the polishing system component from the substrate processing environment. For example, in some embodiments, the system component 800 comprises the platen shield 120 and the hydrophobicity causing chemical solution 204 is applied to a radially inward facing surface of the platen shield 120 using the applicator apparatus 600 described in FIG. 6. In those embodiments, applying the hydrophobicity causing chemical solution 204 may include rotating the polishing platen 106, and thus the applicator apparatus 600 coupled thereto, to urge the hydrophobicity applicator 500 against a radially inward facing surface of the platen shield 120.

In other embodiments, the system component 800 comprises a component of the pad conditioner assembly 110, such as the first actuator 126, the conditioner arm 128, the conditioner mounting plate 130, the second actuator 132, the shaft 134, or combinations thereof. In those embodiments, applying the hydrophobicity causing chemical solution 204 may include sliding the hydrophobicity applicator 400 into a gap disposed between the conditioner mounting plate 130 and the second actuator 132 so that the shaft 134 is disposed through the opening 406 before moving hydrophobicity applicator 400 about the shaft 134.

In another embodiment, the hydrophobic coating 804 may be applied to the surfaces the system component 800 after the system component 800 has been removed from the substrate processing environment 103. In some embodiments, the hydrophobic coating 804 is applied to the pre-application surface 802 of a system component 800 using an atomization method to produce droplets of the hydrophobicity causing chemical solution 204 and exposing the pre-application surface 802 thereto, herein a "spray process." Examples of suitable spray processes include an ultrasonic sprays using an ultrasonic nozzle, pressurized sprays, and electrosprays.

A typical ultrasonic spray process includes operating the ultrasonic nozzle to convert high frequency sound waves into mechanical energy that is transferred into a liquid, e.g., the hydrophobicity causing chemical solution 204, which atomizes the liquid as it exits from an orifice of the nozzle. The ultrasonic nozzle is configured to operate at a resonant frequency which determines a median droplet size of liquid droplets provided therefrom. Typically, ultrasonic nozzles operating at higher frequencies provide relatively smaller median droplets sizes than do ultrasonic nozzles operating at lower frequencies. In one embodiment, the hydrophobicity causing chemical solution 204 is applied using an ultrasonic nozzle operating at a frequency in the range of 10 kHz to about 200 kHz, such as about 200 kHz or less, about 190 kHz or less, about 180 kHz or less, about 170 kHz or less, about 160 kHz or less, about 150 kHz or less, about 140 kHz or less, about 130 kHz or less, about 120 kHz or less, about 110 kHz or less, about 100 kHz or less, about 90 kHz or less, about 80 kHz or less, about 70 kHz or less, about 60 kHz or less, about 50 kHz or less, about 40 kHz or less, for example about 30 kHz or less. In some embodiments, the ultrasonic nozzle is operated at a frequency of about 10 kHz or more, such as about 20 kHz or more, about 30 kHz or more, about 40 kHz or more, about 50 kHz or more, about 60 kHz or more, about 70 kHz or more, about 80 kHz or more, about 90 kHz or more, about 100 kHz or more, about 110 kHz or more, about 120 kHz or more, about 130 kHz or more, about 140 kHz or more, for example about 150 kHz or more.

Pressurized spray processes generally include using a propellant under pressure to provide an aerosol mist of the hydrophobicity causing chemical solution 204 and exposing the pre-application surface 802 of the system component 800 thereto.

In an electrospray process a liquid, e.g., the hydrophobicity causing chemical solution 204, is charged with static electricity through the application of a relatively high voltage, such as about 1000 V or more, to an electrospray nozzle. The electrostatic charge causes the fluid to atomize into a fine mist through electrostatic repulsion. Generally, the system component 800 to be coated is disposed on a grounded stage so that the charged droplets are attracted to the surface thereof. Beneficially, an electrostatic spray process may be used to provide a substantially uniform hydrophobic coating 804 across a system component 800 having a relatively uneven surface.

In some embodiments various activities of the method 700 may be used during refurbishment of a system component 800, such as during the refurbishment of a substrate carrier assembly 104. In one embodiment, the method 700 includes disassembling a substrate carrier assembly 104, removing polishing fluid residue accumulated on the component surfaces thereof, and applying the hydrophobic coating 804 coating thereto using one or a combination of a hydrophobicity applicator 200, 300, 400, or 500 and/or the spray process. Thus, in some embodiments, the hydrophobic coating 804 coating is applied to surfaces of the carrier ring assembly 142, e.g., the inner diameter and the outer diameter, the carrier head 140, the head cover 154, and the surfaces of the one or more annular membrane clamps 150 which may be exposed to polishing fluid during the polishing process. In some embodiments, at least some of the system components are new and thus the method 700 may not include removing polishing fluid residue therefrom.

Beneficially, the method 700 and/or the hydrophobicity applicators 200, 300, 400, and/or 500 described herein facilitate the application of the hydrophobic coating 804 onto the surfaces of a system component 800. The hydrophobic coating 804 reduces the amount of polishing fluid residues that may accumulate on component surfaces between consumable change-outs and other maintenance procedures to provide for a generally cleaner system and reduce substrate processing defects, such as surface scratches, associated with excessive residue build up. By reducing the amount of polishing fluid residue build up on component surfaces, the methods and articles provided herein beneficially reduce the labor and time required to clean those residues and beneficially increase the useful lifetime of the system components. In some embodiments, the methods may be performed at a location remote from the polishing system 100, such as during the refurbishment (rebuild) of a substrate carrier assembly 104. In other embodiments, the method 700 may be performed without removing the polishing system component 800 from the substrate processing environment 103. Applying the hydrophobic coatings onto the system components without disassembling and/or removing the component from the substrate processing environment also beneficially reduces the labor, time, and costs that might result if the system components were to be removed from the polishing system.

While the foregoing is directed to embodiments of the present disclosure, other and further embodiments of the disclosure may be devised without departing from the basic scope thereof, and the scope thereof is determined by the claims that follow.

The invention claimed is:

1. A hydrophobicity applicator, comprising:
an applicator article formed of an open-celled foam material which has a porosity of 60% or more, a density of 50 kg/m$^3$ or more, and a glass transition temperature (Tg) of 25° C. or less; and
a hydrophobicity causing chemical solution, wherein the applicator article and the hydrophobicity causing chemical solution are packaged in a sealed container.

2. The hydrophobicity applicator of claim 1, wherein the applicator article, as disposed in the sealed container, is impregnated with the hydrophobicity causing chemical solution.

3. The hydrophobicity applicator of claim 1, wherein the sealed container comprises a membrane layer separating the applicator article from the hydrophobicity causing chemical solution.

4. The hydrophobicity applicator of claim 1, wherein an amount by weight of the hydrophobicity causing chemical solution within the sealed container is 0.9× or less than an amount by weight which would be needed to fully saturate the applicator article.

5. The hydrophobicity applicator of claim 1, wherein a surface coating formed by the hydrophobicity causing chemical solution has a water contact angle of 85° or more.

6. The hydrophobicity applicator of claim 1, wherein the applicator article is secured to a fastener layer, and wherein the fastener layer comprises one portion of a hook and loop fastening system.

7. The hydrophobicity applicator of claim 1, wherein the hydrophobicity causing chemical solution comprises a siloxane, a fluoroacrylate, or a combination thereof.

8. The hydrophobicity applicator of claim 7, wherein the hydrophobicity causing chemical solution further comprises a hydrocarbon solvent, a fluorosolvent, or a combination thereof.

9. The hydrophobicity applicator of claim 8, wherein the hydrophobicity causing chemical solution further comprises a carboxylic acid, a carboxylic salt, a carboxylic acid derivative, or a combination thereof.

\* \* \* \* \*